2,993,014
EPOXY RESIN COMPOSITION CONTAINING CORK OR BALSA WOOD AND PREPARATION OF EXPANDED PRODUCT THEREFROM

Gerald W. Schardt, Mount Bethel, N.J., assignor, by mesne assignments, to Wilson Products Manufacturing Company, Neshanic Station, N.J., a corporation of New Jersey
No Drawing. Filed Oct. 21, 1957, Ser. No. 691,130
20 Claims. (Cl. 260—2.5)

This invention relates to the preparation of expanded cellular thermoset resinous materials, to compositions from which such expanded materials may be formed, and to the resultant expanded cellular products. More particularly, the present invention relates to novel compositions comprising epoxy resins which can be simultaneously expanded, molded and thermoset; to novel expanded cellular thermoset materials prepared therefrom which are characterized by excellent strength properties, low density, and resistance to attack by heat and by chemicals; and to methods of preparing the same.

Epoxy resins are resinous materials which can be reacted with curing agents such as polyamines to yield thermoset resins of outstanding durability and resistance to environmental degradation. In the manufacture of epoxy resin products such as insulating materials and the like, it is frequently desirable to diminish resin consumption and to decrease the weight of structures made from these resins. The volume occupied by the thermoset resin may, for example, be increased by foaming the resin to produce an expanded cellular material. However, the production of foamed low density thermoset epoxy resin structures has hitherto been attended by considerable difficulties.

Various methods are known for the production of low density structures from plastic materials. Of maximum density are foamed or expanded cellular structures. By expanded cellular materials or structures are herein meant products having a substantially greater volume than the initial plastic composition prior to expansion, and produced by the development of bubbles in the plastic mass followed by setting the polymer structure without destruction of the bubbles. Expanded cellular materials may be contrasted to porous materials which, like expanded cellular materials, are penetrated by small open spaces, but which are either essentially unchanged in volume or else contracted when the initial plastic mass is molded and set. The term porous is reserved in this discussion for the designation of non-expanded materials of this description.

Porous resinous materials can be produced, for example, by treating particulate substances with a resinous binder whereby a coherent product is produced through the adhesive action of the binder on the particles at their points of intersection. Voids and interstices between the particles as well as any natural porosity of the particles results in the production of a porous structure. Such porous structures are ordinarily shaped and molded under heat and positive pressure, the resinous binder being set during the molding cycle. Because of the compression applied in the molding process, very light and open structures are difficult or impossible to produce. On release of the molding pressure, the porous product may expand slightly due to resilience of the particulate material, but such elastic recovery is limited. The maximum volume obtainable in the production of porous structures is that of the initial particle-binder mixture before setting, and ordinarily the application of mold pressures results in a considerable reduction of this volume. For the production of low density, high volume resinous structures, methods resulting in expansion of the initial resinous compositions are employed.

Expanded or foamed cellular structures have been prepared from a variety of thermoplastic and thermosetting materials including rubber, polystyrene, polyvinyl chloride, polymethyl methacrylate, urea-formaldehyde resins, epoxy resins and the like. The methods employed for the preparation of such structures commonly involve the expansion of a gas or volatile solvent within a plastic mass of the polymer or resin. One such method comprises incorporating a volatile solvent or gas under pressure in the polymer and then abruptly releasing the pressure to allow bubbles of the vapor to expand in the plastic mass. Alternatively, gas is generated within the mass by (1) incorporation of chemical compounds which decompose to form a gas on heating; (2) heating above the decomposition point of the polymer to generate gaseous decomposition products; and (3) introduction of substances which react with the polymer to form gaseous or volatile reaction products.

It will be obvious that some of these methods for the production of expanded cellular structures are severely limited in applicability, since only a small number of polymers have the necessary reactivity. Others in practice can be used only for foaming thermoplastic resins. The materials employed in many of these processes are expensive, or toxic, or both. Gaseous, volatile, and heat-sensitive substances as used in these processes are difficult to store and to handle. The heat required by various of these methods has a deleterious effect on the resin properties.

Porous and cellular resins made by these processes have been brittle, permeable to fluids, and of insufficiently low density.

It is a principal object of the present invention to provide a novel and improved method for the production of expanded cellular structures comprising epoxy resins.

It is another object of this invention to provide novel resinous compositions which can be simultaneously expanded, molded and thermoset.

It is an additional object to provide resinous polymeric products having a low density cellular structure and characterized by superior strength, resilience and resistance to chemical degradation.

Another object is to provide novel expanded cellular structures comprising a thermoset epoxy resin characterized by low water permeability.

Still another object of this invention is to provide a novel method for the production of expanded thermoset cellular structures utilizing heat-stable, non-toxic foaming agents.

A further object is to provide a process for the production of an expanded thermoset resinous material which does not require the use of elevated temperatures.

These and other objects will become apparent from the following specification and claims.

It has now been found that an epoxy resin, on treatment with an epoxy resin curing agent, in contact with a cork material, as further defined hereinafter, forms an expanded cellular thermoset product. Thus the method of the present invention comprises mixing an epoxy resin and an epoxy resin curing agent in the present of a cork material and permitting the mixture to expand while thermosetting of the resin takes place. The novel resinous compositions capable of being simultaneously expanded and thermoset provided by this invention comprise a mixture of an epoxy resin and a comminuted cork material The product resulting from mixing an epoxy resin, an epoxy resin curing agent and a comminuted cork material, and permitting the mixture to expand while thermosetting of the resin takes place is an expanded cellular thermoset epoxy resin structure containing comminuted cork material.

That the process of this invention results in the production of an expanded cellular material is highly surprising. Ground cork and similar comminuted carbonaceous substances have been widely used as fillers in resins hitherto. In such systems with thermosetting resins with which they had been used previously, the comminuted carbonaceous substances have acted merely as mechanical fillers. Depending on the particle size of the carbonaceous materials, products of varying degrees of porosity have been produced; due to the resilient nature of materials such as cork, some relaxation and recovery of volume on release of the molding pressure has been noted; but foaming expansion in such systems at atmospheric pressure to produce an expanded cellular material of substantially increased volume has never previously been reported.

The present process is to be distinguished from prior art processes leading to production of porous, non-expanded materials. In contradistinction to such prior art methods, this invention leads to a distinct and substantial increase in volume during the conversion of the initial resinous composition to the thermoset condition.

The mechanism by which the process of this invention operates is not as yet understood. Epoxy resins when thermoset and cured alone contract in volume. Fillers other than cork-like materials do not exert a foaming and volume-expanding effect: thus, neither porous mineral fillers such as diatomaceous silicas, nor carbonaceous materials such as hard wood flours were found to produce foaming expansion like that produced by incorporation of comminuted cork materials with epoxy resins in accordance with this invention. Cork materials are not known to cause conversion of other resins to expanded, cellular structures. The present invention is accordingly based on an entirely new and unexpected phenomenon.

The process of this invention whereby a foamed expanded epoxy resin cellular structure is formed is particularly advantageous as compared with prior art methods for preparing low density resin foams by virtue of the superior reproducibility thereof and freedom from undue sensitivity to minor variations in resin composition, proportions of reactants, procedural techniques, and the like. It is accordingly especially of utility under conditions where close procedural control is impracticable, as in small manufacturing operations. The present process is also favorably distinguished from prior art foaming processes in that it avoids the use of toxic or highly flammable foaming agents. The cork materials by virtue of which foaming is produced in accordance with this invention are stable and readily available articles of commerce, which are free of toxicity and other deleterious properties, and in fact, contribute qualities such as resilience and buoyancy to the resulting expanded products. Moreover, in addition to its foaming action, the cork material acts as an extender for the resin, so that the foamed product has a particularly low resin content. Compositions comprising a mixture of epoxy resin and particulate cork material, which compositions may be expanded upon being thermoset by reaction with an epoxy resin curing agent in accordance with this invention, may be prepared in advance to be shipped or stored as desired, and are stable even at elevated temperatures.

The presently provided expanded cellular products are low density materials characterized by numerous advantageous properties. Nothwithstanding the reduction in resin usage accomplished by the present process, expanded products embodying the invention have properties equal to or superior to prior art epoxy resin foamed structures. Epoxy resin foamed structures prepared in accordance with this invention are characterized by excellent strength, durability and insulation value, combined with an exceptionally low resin solids content in a given volume, extremely low density, and improved buoyancy and resiliency. Different degrees of hardness and flexibility may be imparted to the present products by variation in the proportion of cork material present, in the choice of curing agent, and other factors. In addition to possessing outstanding toughness and resistance to mechanical shock, the present expanded products are characterized by excellent resistance to degradation by heat or by chemical reagents such as solvents and the like. As will be evident from the preceding descriptions, the products of this invention are well suited for use in forming heat, sound, and electrical insulation, in the manufacture of light-weight, durable articles, and for numerous other industrial purposes. Furthermore, the present expanded materials may be produced in a form impermeable to water, and their buoyancy and water-proof qualities render them well adapted for the manufacture of fishing equipment, life preservers, rafts and other floating devices.

The epoxy resins employed in the process of this invention are well known. The general characteristic of this class of materials is the presence of epoxy groups, which are of the formula

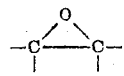

by the reaction of which the epoxy compound may be cured to give a solid, thermoset, resinous material. Ordinarily, epoxy resins contain a plurality of terminal epoxy groups. Usually epoxy resins are of moderately high molecular weight, containing more than 10, and usually more than 20 carbon atoms per molecule.

Epoxy groups can be introduced into organic molecules, particularly cyclic organic compounds, by treatment of an aliphatic double bond with an appropriate oxidizing agent. However, epoxy resins are typically prepared by reaction of a polyfunctional epoxy compound with a polyol, that is, a compound containing two or more hydroxy radicals, producing epoxy resins comprising one or more ether linkages joining organic radicals and terminating in epoxy groups. The epoxy resins used in the manufacture of expanded materials in accordance with the present process will ordinarily be of this description.

A preferred class of epoxy resins for use in the process of this invention are the product of reaction of a polyfunctional epoxy compound with an aromatic polyhydric phenolic compound. The polyfunctional epoxy compound used in this connection may be a diepoxide, distinguished from the class of epoxy resins by its relatively low molecular weight, illustrative of which are diepoxybutadiene, bis (2,3-epoxy-2-methylpropyl) ether and the like. More usually, the polyfunctional epoxy compound is a haloepoxy compound, most commonly, epichlorohydrin. Reaction of epichlorohydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkoxy radicals. The aromatic polyhydric compound may comprise a monocyclic phenol such as a resorcinol, a polycyclic phenol such as p,p'-(dihydroxy)-biphenyl, a phenolic resin such as a phenol-formaldehyde resin, and the like. In particular, there are preferred in the process of this invention, epoxy resins derived from the reaction of epichlorohydrin and bisphenols, which resins correspond to the general formula

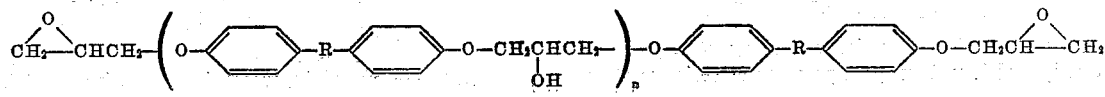

where $n$ is an integer, including zero; R is a linking radical selected from —O— and

where Y is selected from H and $C_xH_{2x-1}$ and $x$ is an integer of from 1 to 16.

of course, is a phenylene radical which may or may not be substituted by non-interfering substituents, such as a halogen atom or a lower alkyl radical containing from 1 to 6 carbon atoms. Illustrative of bisphenols which may be employed to produce resins of the above formula, giving rise to the arylene radical represented by the group

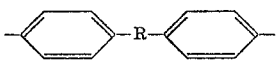

are, for example, p,p'-oxybisphenol, p,p'methylenebisphenol, 2,2-bis(4-hydroxyphenyl)propane, 2,2-bis(4-hydroxy-2-methylphenyl)-propane, 2,2-bis(2-t-butyl-4-hydroxyphenyl)propane, 2,2-bis(2,5-dimethyl-4-hydroxyphenyl)propane, 2,2-bis(2-chloro-4-hydroxyphenyl)propane, 2,2-bis(2-bromo-6-fluoro-4-hydroxyphenyl)propane, 1,1-bis(4-hydroxyphenyl)ethane, 1,1-bis(4-hydroxyphenyl)isobutane, 1,1-bis(2-isopropyl-4-hydroxyphenyl)isobutane, 2,2-bis(4-hydroxyphenyl)butane, 4,4-bis(4-hydroxyphenyl)heptane, 1,1-bis(4-hydroxyphenyl)-dodecane, 2,2-bis(4-hydroxyphenyl)hexadecane, and the like. Resins prepared from epichlorohydrin and 2,2-bis(4-hydroxyphenyl)-propane, as represented by the general formula

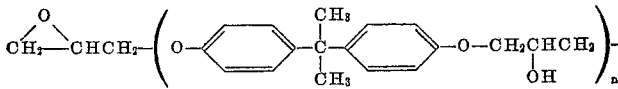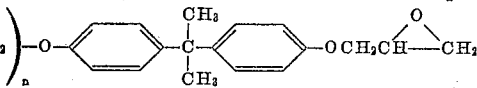

wherein $n$ is an integer are particularly preferred in the process of this invention.

Another class of epoxy resins commercially available and useful in the present process comprises aliphatic epoxy resins. Compounds of this nature may, for example, be prepared by a process analogous to that employed in preparing an epoxy resin from a bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, sorbitol and the like. A compound of this nature may be represented by the formula

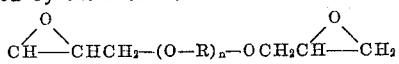

where R is an aliphatic group containing only C, H and O, and $n$ is an integer, including zero.

In general, aliphatic chains produce more flexible resins than aromatic, and mixed aliphatic and aromatic chains may alternatively be introduced into an epoxy resin, using the aforedescribed procedures, producing resins of modified properties.

As mentioned above, epoxidized cycloaliphatic compounds such as a diepoxide of diethylene glycol bisdihydrodicyclopentadienyl ether, are also comprised within the class of epoxy resins curable to thermoset resinous products. Other feasible variations in epoxy resin structure will be known to the art. This invention contemplates the use of any of the variety of epoxy resins conventionally used in the industry for the production of resinous materials by curing processes.

It will be understood that in commercial epoxy resins, the integer $n$, representing in the above formulae the number of times the repeated unit of the polymer chain recurs, will vary from molecule to molecule. In general, any commercial resin will represent a mixture of resins of varying chain lengths corresponding to a varying number of repeated units. Compared to other widely-used resin products, the epoxy resins are of relatively low molecular weight, and at least in part of the molecules, $n$ may even be zero. Such resins are nevertheless designated as polymeric, however, with reference to the duplication of chain units in the molecule, and to the at least partial content of polymeric molecules usually present. Furthermore, though ideally the resin molecule, as represented by the above-illustrated formulae, contains two epoxy groups per molecule, in practice it is found that the resinous products have a varying average number of epoxy groups per molecule. The epoxy group content of such resins is conventionally expressed as the epoxide equivalent, which refers to the grams of resin containing a gram equivalent of epoxide. The epoxide equivalent of a commercial resin is generally expressed as a range, such as 125–175, 150–200, etc. In the practice of this invention, epoxy resins having low epoxide equivalents, below about 250, are preferred because of the lower viscosity of such resins.

In accordance with one embodiment of this invention, the epoxy resin employed may consist of a mixture of a polymeric epoxy resin and a monomeric epoxy compound. By a polymeric epoxy resin is here meant, as pointed out above, epoxy resins as described above, including resins of the above formulae where $n$ is zero. By a monomeric epoxy compound is here meant epoxy compounds of low molecular weight and characteristically containing a single epoxy group. As used in the present specification, the term epoxy resin refers either to a polymeric epoxy resin alone, or to a mixture of such polymeric epoxy resin with a monomeric epoxy compound.

The use of an admixture of such a monomeric epoxy compound has the advantage that the viscosity of the epoxy resin is reduced. It is thus possible to use higher molecular weight and more viscous polymeric epoxy resins in the process of the invention while maintaining a workable viscosity in the composition employed for the production of expanded materials. It has been found that such monomeric epoxy compounds enter into the polymer chain during the subsequent cure, and the presence of a small percentage of the monomer does not significantly change the ultimate properties of the thermoset expanded materials. Up to about 25% by weight of the monomeric epoxy compound with respect to the epoxy resin may be used in the process, if desired. Illustrative of epoxy compounds which may be employed in this connection are aliphatic epoxy ethers such as allyl glycidyl ether corresponding to the formula

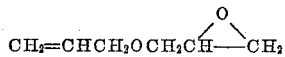

aromatic epoxy compounnds such as phenyl glycidyl ether, glycidylbenzene and styrene oxide (1,2-epoxyethylbenzene) hydroxyalkyl glycidyl ethers such as 2-hydroxyethylglycidyl ether and the like. Monomeric epoxy ethers are particularly preferred in this connection.

As is well known in the art, to convert epoxy resins to the thermoset state, these resins are treated with epoxy resin curing agents, that is, agents effective to produce thermosetting and cure of epoxy resins. By reference to thermoset resins are herein meant materials which are form-retaining and stable to heat: they are not necessarily set in shape by the application of heat. Curing agents effective to thermoset epoxy resins are frequently active at room temperature or below, simple admixture of such a low temperature epoxy resin curing agent with the epoxy resin producing a chemical reaction, often exothermic, by which the resin is permanently set in form.

The resin resulting from reaction with the curing agent is referred to as a thermoset epoxy resin. Low temperature epoxy resin curing agents are preferred in the present connection, because of the convenience of their use. However, the use of epoxy resin curing agents requiring elevated temperatures to initiate the thermosetting reaction is not excluded.

It will be noted that the agents effective to cause thermosetting of epoxy resins are referred to in the art as "curing" agents, whereas "cure" in the resin art generally refers to a more advanced stage of resin development than initial thermosetting. This occurrence of curing subsequent to thermosetting is further discussed hereinafter. Epoxy resin curing agents convert the resin to the cured state, as reaction continues. It is believed that this thermosetting and curing process involves a cross-linking mechanism and the present epoxy resin curing agents are sometimes referred to as cross-linking agents.

A variety of materials reactive with epoxy resins to effect cure thereof are known in the art. Epoxy resin curing agents include Lewis acids, such as $BF_3$; bases such as tertiary amines; and diverse compounds characterized by the presence of an active (Zerewitinoff) hydrogen atom, including, for example, nitrogen compounds such as amines, amides, urea and the like, as well as oxygen compounds such as phenolic resins.

One class of epoxy resin curing agents which may advantageously be employed in the present process comprises polyamines. Illustrative of the class of polyamine epoxy resin curing agents are for example, N,N-diethylethylenediamine, ethylenediamine, diethylenetriamine, diethylenetetramine, N-(hydroxyethyl) diethylenetriamine, phenylenediamine and the like. Aliphatic polyamines of the formula $H-[-HNC_2H_4-]_x-NH_2$, where $x$ is a whole number (1, 2, 3, etc.) are preferred, particularly preferred being polyalkylenepolyamines such as triethylenetetramine, combining high reactivity with epoxy resins with low volatility.

Another group of amine compounds which are reactive with epoxy resins are condensation products of a polymerized long chain fatty acid compound, such as dimerized or trimerized vegetable oils or unsaturated fatty acids, with an aryl or alkyl polyamine. Illustrative of such materials are the condensation products of a polymerized (dimerized or trimerized) fatty acid such as dimerized linoleic acid or a polymerized vegetable oil such as dimerized linseed oil with an amine such as ethylenediamine. These polymers are generally known as polyamides and will be referred to as such herein. The polyamides are generally employed in conjunction with the aforementioned curing agents comprising aliphatic polyamines, in which connection they offer several advantages. Mold shrinkage of the expanded resin product is reduced by the use of polyamides in conjunction with the aliphatic amines. Greater flexibility and impact resistance can be obtained in the final product. As the reaction of this invention is exothermic, the low volatility of the polyamide compounds is of great value. Also in connection with the exothermic nature of such reactions, it is possible for the build-up of heat in large masses of reacting materials to exceed the decomposition temperature of one or more of the ingredients, resulting in weak or discolored end product. The polyamides being less highly reactive than the polyamines, the exotherm of the reaction can be partially controlled by use of increased proportions of polyamides to polyamines as the mass of the reacting resin is increased.

Similarly, other types of epoxy resin curing agents, such as phenol-formaldehyde resins, boron trifluoride, tertiary amines such as benzyl dimethyl amine, and the like, may be employed, alone or in admixture with the curing agents hereinabove mentioned.

In the process of this invention, conventional epoxy resin curing system—that is, mixtures of epoxy resin and curing agent—are employed. Illustrative resins and curing agents are listed above. In general, the curing systems comprise about 5 to 15% by weight curing agent with respect to epoxy resin, but this proportion may vary very widely, from 1% or less to 50% or more of curing agent. Where the curing agent is an active hydrogen compound, the proportions of epoxy resin and curing agent may be related by the stoichiometry of the reaction of the functional groups present in the respective components of such systems. As a general rule, sufficient curing agent will then be employed to supply at least one reactive site, such as an active hydrogen atom—for example, a hydrogen atom on an amino radical—for each epoxy group present in the resin. Advantageously, the epoxy resin curing agent is employed somewhat in excess of theoretical requirements.

Calculated mixtures of epoxy resins and curing agents therefor will give upon curing, infusible, solid, thermoset end products which demonstrate various degrees of hardness, flexibility and strength, determined by the proportions of each ingredient used and the nature thereof, as is well known in the art. Epoxy resins are widely used in industry today. There are many applications, however, where a material with the same physical properties and chemical structure but with a lower density would be of extreme value—for example, for use as low weight potting compounds, castings, insulation materials and so forth. In order to produce an expanded, low density resin, a foaming process such as those mentioned above may be used, but as has been noted, all of the known methods have various disadvantages.

It has now been found that a cork material, when contacted with an epoxy resin curing system, during the reaction of the epoxy resin with the curing agent whereby thermosetting is effected, causes the resin to expand to a foamed mass. The cork material employed in the novel process of this invention may be cork. Cork is a component of wood bark, and is defined as that component of bark which, when highly comminuted, will float on a benzene-carbon tetrachloride mixture having a density of 1.24 g./cc. Massive cork is ordinarily obtained from certain sub-tropical species of oak such as the cork oak, *Quercus suber*. Bark fractions rich in cork can be produced from domestic American species of trees, such as the Douglas fir. This type of cork material is known as domestic or native wood bark cork. Comminuted whole bark is also an operative cork-containing material in the process of this invention; and in this embodiment of the invention, there may be employed the bark of trees such as maple, elm, fir and the like. Furthermore, instead of cork or a cork-containing material, other cork-like materials, such as the wood of certain trees such as balsa wood (which is also known as cork-wood), are also operable in the present process. As used herein, the term cork material denotes either cork, including cork present in a cork-containing material like whole bark, or equivalents thereof, including cork-like materials such as balsa wood.

In its broadest aspects, the process of this invention comprises thermosetting an epoxy resin by reaction with an epoxy resin curing agent in the presence of a cork material, which may be in the form of sheets, slabs or any of a variety of other forms offering a surface of cork material with which the epoxy resin curing system may be contacted.

Most preferably, for the production of foamed epoxy resin structures in accordance with the present invention, the cork material is employed in comminuted form, in the shape of flakes, crumbs, powder or similar material. Particle size is generally not critical, and any free flowing comminuted form of cork material may be used. Foaming occurs at least at the surface of the cork material particles or pieces, and where desired, comminuted material of substantial individual particle size may be employed. Foamed masses are produced, for example, when employing cork material comprising crumbs of approximately ¼ inch in diameter. However, uniformity of the foamed mass is favored by selection of a relatively finely divided material, of the nature known as a cork powder or flour, whereby a smooth product is produced, in which discrete particles are indetectable. A fine particle size also promotes uniform cell structure. In general a particle size below about 10 mesh screen will be preferred, and ordinarily the particle size will advantageously be at least as fine as 20/30 mesh for a major proportion of the material. Commercially available cork powder, of a particle size such that it is 62% through 80 mesh screen, has been found eminently satisfactory for this application; and finer material, passing through 260 mesh or finer screen may be employed when desired.

The proportion of cork material to epoxy resin may be varied within wide limits. It has been found that as little as 0.5% by weight or less exhibits a definite foaming action. In practice, the proportion of cork material utilized is limited by the workability of the mixtures employed in carrying out this invention, wherein, to result in uniform products, it is desirable that the components employed be substantially homogeneously admixed. Between 3 and 10% by weight of cork material with respect to the weight of the epoxy resin has been found to produce excellent results while still maintaining workability. To obtain the benefits of this invention, whereby there is produced an expanded cellular structure having the desirable characteristic of epoxy resin products, and with a much improved density factor, the proportion of cork material will ordinarily be limited to below about 20% by weight with respect to the epoxy resin.

In carrying out the process of the invention to produce an expanded cellular structure, the epoxy resin, comminuted cork material, and epoxy resin curing agent are mixed together. The order of mixing should be such that the cork material is dispersed in the reacting mixture of epoxy resin and epoxy resin curing agent during conversion of the resin to the solid thermoset state. Advantageously, the components of the mixture will be mixed together to form a substantially homogeneous dispersion. If desired, the epoxy resin, cork material and epoxy resin curing agent may be mixed together all at once, the thermosetting reaction of the resin with the curing agent then being initiated. However, as is well known in the art, many epoxy resin curing agents, such as the aliphatic polyamines, are sufficiently active as to exotherm immediately on contact with an epoxy resin, initiating a rapid thermosetting reaction. Accordingly, it forms a preferred embodiment of this invention to prepare a mixture of the comminuted cork material with one of the other components employed in the process of the invention, prior to addition of the third component, whereby preparation of a homogeneous ultimate mixture is facilitated. The epoxy resins and the epoxy resin curing agents are each generally liquid materials, and the cork material may be mixed with either to form a uniform dispersion. Generally, a greater volume of epoxy resin than of epoxy resin curing agent will be employed, and a particularly preferred embodiment of this invention comprises incorporating the comminuted cork material into the epoxy resin.

By mixture of the comminuted cork material with the epoxy resin, there is thus provided an epoxy resin composition capable, upon addition of an epoxy resin curing agent, of being expanded on being thermoset. Such compositions, comprising a mixture of an epoxy resin and a comminuted cork material, in contrast to prior art compositions comprising an epoxy resin and a foaming agent capable of producing expansion of the resin, are stable to elevated temperatures, and may readily be prepared in advance for storage and shipment as desired. The ingredients of such compositions are substantially non-toxic, and the components may be handled without special precautions which have been required hitherto in the preparation of expandable, foamable resinous compositions. For the production of the present compositions, simple open or closed mixing devices may be employed, without requiring special ventilators, cooling attachments or the like. As noted hereinabove, the epoxy resins having low epoxide equivalents, below about 250, have low viscosities and are preferred for the present purpose. Particularly preferred among such epoxy resins are the resins which are the condensation products of epichlorohydrin and a bisphenol, especially 2,2-bis(4-hydroxyphenyl)propane. Part or all of the comminuted cork material to be employed in preparing the ultimate expanded thermoset structures may be mixed with the epoxy resin in preparing the present compositions, the proportion of cork material to epoxy resin being as indicated above, or less, depending on whether additional cork material is intended to be added subsequently. The present compositions containing epoxy resin and comminuted cork material may also comprise additional ingredients, as for example, surface active agents promoting dispersion of the cork material in the epoxy resin; monomeric monoepoxy compounds, as mentioned hereinabove, reducing the viscosity of the epoxy resin compositions and enhancing the workability thereof; and the like. If desired, such compositions capable of being expanded upon being thermoset may also contain epoxy resin curing agent which is relatively non-reactive, so that a further step is required to initiate thermosetting, such as heating, addition of an active epoxy resin curing agent which triggers reaction of the less active curing agent, or the like.

The comminuted cork material serves a dual purpose in the present application, effecting foaming of the resin, and also acting as a filler or extender in the resulting expanded product. In addition, various other ingredients such as pigments, reinforcing agents and the like may be incorporated in the ultimate product, for example, by admixture with the epoxy resin or curing agent before the latter two are contacted. Cork material comprising cork, balsa, and the like employed in the process of this invention is light in color, and by the use of relatively small amounts of pigment, the presently provided expanded polymeric materials can be uniformly colored as desired in shades including white and light colors. As a substitute for the above-mentioned polyamides used in epoxy resin curing systems, other polymeric materials such as phenol-formaldehyde and urea-formaldehyde resins, rubbers such as a polysulfide rubber, as exemplified by Thiokol (sold by Thiokol Chem. Corp., Trenton, N.J.), hydrocarbon polymers such as a polybutene as exemplified by Vistanex (sold by Enjay Co., New York, N.Y.), and similar materials may alternatively be employed. Additionally, there may be incorporated into the products of the invention, fillers such as fibrous reinforcing agents as exemplified by cotton and rayon fibers, asbestos, rock wool, glass fibers and the like. The present expandable molding compositions may also comprise, as needed, other materials such as lubricants, stick suppressors, stain suppressors, dispersing agents and so forth.

Expanded cellular structures are produced in accordance with this invention by thermosetting an epoxy resin by reaction with an epoxy resin curing agent in the presence of a comminuted cork material dispersed in the resinous mass, while permitting the expansion of the mass. The method of the invention may be carried out by intimately mixing the epoxy resin with the comminuted cork material and the epoxy resin curing agent, and thermosetting said epoxy resin by reaction with said epoxy resin curing agent in a space having a volume greater than the combined volume of said materials initially. The mixture of the epoxy resin and epoxy resin curing agent, which is in a plastic state during the thermosetting process, is caused to foam and expand to a cellular structure by the presence of comminuted cork material dispersed therein, and is thus simultaneously expanded and thermoset to form a cellular resinous product.

In a preferred embodiment of the present process, the comminuted cork material is incorporated into the epoxy resin prior to conversion of the epoxy resin to the thermoset condition by reaction with an epoxy resin curing agent. Thus for example, in accordance with a preferred embodiment of this invention, a mixture of a comminuted cork material and an epoxy resin is mixed with an epoxy resin curing agent, and the epoxy resin is reacted with the curing agent to form a thermoset product under conditions permitting expansion of the resinous mass.

The mixture of the epoxy resin and epoxy resin curing agent with the comminuted cork material may or may not require heating to initiate reaction of the epoxy resin with the curing agent, depending on the nature of the resin and curing agent in the system, as is well understood in the epoxy resin art. Heating may also be employed if desired to accelerate the reaction of these components in cases where reaction is slow or retarded; with thick sections, or with highly reactive curing agents and/or epoxy resins, cooling may alternatively be desirable, to prevent carbonization of the resulting foamed plastic. The exotherm of the reaction of the epoxy resin with the curing agent will frequently produce temperatures of 100° C. and above in the reacting mass. In general, the temperature control employed will conform to usual epoxy resin thermosetting practice. It is preferred in the present process to employ systems of epoxy resin and curing agent therefor, such as epoxy resins which are condensation products of epichlorohydrin and bisphenols, especially 2,2-bis-(4-hydroxyphenyl)propane, and curing agents which are aliphatic polyamines, which systems are reactive at room temperature, so that external heating is not required.

The degree of expansion which is attained by the product is affected by the temperature of the reacting mass, as well as by such factors as the proportion of cork material to resin and the volume of the space in which the expansion takes place. High temperatures, as produced by a high exotherm in rapidly reacting epoxy resin systems, favor maximum expansion. An increase in volume of from about 50% to about 400% may readily be produced. It is particularly notable that the reproducibility of the degree of expansion exhibited by a given epoxy resin curing system in the process of the invention is excellent.

In carrying out the process of this invention, the components employed will ordinarily be mixed and then injected, as by pouring, pumping or the like, in the plastic state, into a space, such as an oversized mold, in which expansion of the mass can occur during the thermosetting process. Depending on the shape and properties of the desired products, open or closed molds may be employed.

By carrying out the process of this invention in a confined space, the presently provided compositions can be simultaneously expanded, molded and thermoset. When the expansion is carried out within a lubricated mold, the cellular products have a skin of non-foamed, smooth, mar-resistant resin over the low-density expanded core of the thermoset molded article. Exemplary of suitable mold lubricants are the silicone release agents. If desired, articles comprising the presently provided resin foams may be formed by cutting the expanded cellular materials of this invention into sections to produce individual pieces. The present cellular resinous products are easily cut and shaped: they saw cleanly, like wood, without melting or gumming.

The process of this invention may also be practiced by permitting the expansion of the resinous mass to take place within surfacing materials or within spaces to be filled in construction of insulation and the like. During the thermosetting stage, while the resinous mass is in the plastic state, it is highly adhesive, and will readily cohere to non-lubricated surfaces such as wood, steel, aluminum and the like. Thus, for example, spaces to be insulated between walls of refrigerators, thermos bottles, building structures and so forth, may be filled by rapidly mixing the epoxy resin curing agent with the epoxy resin and comminuted cork material and injecting the mixture within the spaces so that it expands and adheres to the walls. The adhesive qualities of the foaming mass may also be used to fix in position inserts in molds, as in potting electrical components.

Completion of the expansion and thermosetting process is evident by cessation of an increase in the volume of resin foam and, generally, decrease in the generation of heat by the exothermic reaction of the epoxy resin with the curing agent. Thereafter the epoxy resin foam is dimensionally stable and may if desired be removed from the mold. However, the epoxy resin, though thermoset, is generally not fully cured at this stage. By a cured resin is meant one which is infusible and fully polymerized and cross-linked. Full strength and durability are generally not developed until curing of a resin is complete. The curing process will ordinarily take place spontaneously in pieces which are let stand at room temperature, reaching completion within a matter of hours or days. The time required to achieve full curing of the present expanded struuctures depends on the choice of curing agent, the nature of the epoxy resin, the shape and size of the molded pieces and similar considerations. Advantageously, the cure of expanded foams is facilitated by heat. Accordingly, one preferred embodiment of this invention comprises completing the cure of the resinous product, subsequent to expansion and thermosetting, by exposing the expanding structures to heat. Times and temperatures to be employed to complete the cure of thermoset structures by heating are well understood in the epoxy resin art. Thus, the accelerating effect of elevated temperatures makes it desirable to cure the structures at above about 100° C., but because the heat conductivity of epoxy resins is low, thick and massive pieces are preferably cured at lower temperatures. Curing techniques will readily be selected appropriately by skilled workers.

The invention is illustrated but not limited by the following examples.

Example 1

Two mixtures were prepared in separate containers with thorough agitation of each to obtain a homogeneous mixture of all ingredients.

Mixture A contained 75 parts by weight of an epoxy compound having the general formula

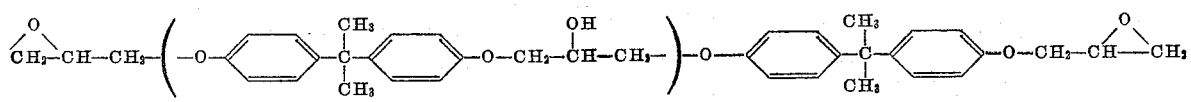

with an epoxide equivalent of approximately 175–210, and 5 parts by weight of finely powdered cork, having the following sieve analysis:

3% retained on No. 20 mesh
3% retained on No. 30 mesh
14% retained on No. 50 mesh
18% retained on No. 80 mesh
62% through No. 80 mesh Mixture B consisted of 10 parts by weight of triethylene-tetramine and 37 parts by weight of a polyamide comprising a thermoplastic polymer prepared by condensation of a polymerized unsaturated fatty acid of the nature of dilinoleic acid and an aliphatic amine of the nature of ethylene diamine. (Versamid 115, sold by General Mills, Kankakee, Ill.)

The two mixtures were then mixed together thoroughly for about one minute, or until all the ingredients were intermixed, and then poured into a mold pretreated with a silicone release agent, and allowed to stand at room temperature. The temperature of the mixture increased as the reaction proceeded, with the resinous mass expanding to three or four times its original volume in ten to fifteen minutes, at which time exotherming ceased. After cooling, the mass was removed from the mold and examined. It consisted of a low density, hard, expanded thermoset plastic. The exterior surface of the mold-plastic interface was smooth and glossy, containing no cell pockets. A cross sectional cut of the foamed product showed it to have a hard, strong, non-foamed thick skin with a foamed low density core which increased in density toward the periphery of the casting. Completion of the curing cycle was accomplished by oven baking at 140° F. for a period of 12 hours, whereby, the rigidity and tensile strength of the product were increased. The material produced in the manner described, after being fully cured, is solvent resistant, light brown in color, and stable to temperatures up to 400° F. It has a generally closed-cell structure. The specific gravity of the cured product is about 0.2, and it will float on water. The product has a resistivity, varying somewhat with the density of the section used for the measurement, of the order of $10^{14}$ to $10^{15}$ ohms/cm.

Example 2

This example describes use of monomeric epoxy compounds as components of the epoxy resin curing system.

Two mixtures were prepared in separate containers with thorough agitation of each to obtain a homogeneous mixture of all ingredients. Mixture A contained 65 parts by weight of an epoxy resin and 5 parts by weight of finely divided cork, as described in Example 1, and 10 parts by weight of phenyl glycidyl ether corresponding to the formula

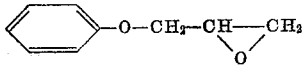

Mixture B consisted of 37 parts by weight of the polyamide described in Example 1 and 10 parts by weight of triethylenetetramine.

Mixtures A and B were mixed together thoroughly, poured into a mold pretreated with a silicone release agent, and allowed to expand as in Example 1. The inclusion of the phenyl glycidyl ether in this case gave a lower viscosity mixture which was easier to mix and pour into the mold. After curing, as in Example 1, an expanded thermoset plastic was obtained having an expanded volume and properties similar to those of the product obtained as described in Example 1.

Essentially identical results are obtained employing the same proportion of allyl glycidyl ether or of styrene oxide instead of phenyl glycidyl ether.

Example 3

This example describes the effect of including a higher proportion of polyamide in the curing system.

Two mixtures were prepared in separate containers with thorough agitation of each to obtain a homogeneous mixture of all ingredients. Mixture A had the same composition as that of mixture A described in Example 2, and contained 65 parts by weight of epoxy resin, 5 parts by weight of finely divided cork and 10 parts of phenyl glycidyl ether. Mixture B contained 50 parts by weight of the polyamide described in Example 1 and 10 parts by weight of triethylenetetramine. The two mixtures, so prepared, were mixed together thoroughly, poured into a mold pretreated with a silicone release agent, and allowed to expand as in Example 1. After expansion and curing, a thermoset material was obtained which showed greater flexibility and resiliency than those obtained in Examples 1 and 2. This change in properties can be attributed to the increased amount of the polyamide used, and these properties can be further varied by using varying amounts of polyamide.

Example 4

This example describes substitution of an alternative polymer for the polyamide.

The procedures and ingredients of Example 1 were followed, with the substitution of an equal weight of a polysulfide polymer having a molecular weight of about 1000 (Thiokol LP-3, sold by Thiokol Chemical Corp., Trenton, N.J.) for the polyamide described in that example.

An expanded low density thermoset product was obtained resembling that prepared as described in Example 1.

Example 5

This example describes expansion of the thermosetting system under conditions permitting adhesion to surrounding surfaces.

The procedures and ingredients used were as in Example 1 with the exception that the mold, which was constructed of tin-plated steel, was not coated with a silicone release agent. Upon expanding and curing, the expanded mass was found to adhere tenaciously to the mold walls.

Example 6

This example describes incorporation of a pigment in the expansion system.

Two mixtures were prepared as in Example 1. Mixture A contained 75 parts by weight of the epoxy resin described in Example 1 in which 15 parts by weight of rutile titanium dioxide pigment had been dispersed. To this was added 5 parts by weight of finely divided cork. Mixture B corresponded to that used in Example 1. The two mixtures were thoroughly mixed together and poured into a prelubricated mold. The resinous mass was expanded, cured and cooled. When removed from the mold, the expanded, low density thermoset material obtained was uniformly and completely of white coloration.

Example 7

This example describes incorporation of a reinforcing agent in the expansion system.

Two mixtures were prepared as in Example 1. The first mixture contained 65 parts by weight of the epoxy resin described in Example 1, 5 parts by weight of finely divided cork, as described in Example 1, and 10 parts by weight of phenyl glycidyl ether. The second mixture contained 37 parts by weight of triethylenetetramine and 2 parts by weight of ¼ inch glass rovings. The mixtures were mixed together thoroughly and poured into a prelubricated mold. The mass was expanded, cured and cooled, as in Example 1. The product obtained was a thermoset expanded mass which showed great strength. The glass rovings acted as an inert filler and reinforcing agent to which the cured resin adhered tenaciously.

Example 8

This example describes production of an expanded product using an epoxy resin curing agent other than an amine.

Six parts by weight of boron trifluoride were dissolved in 150 parts by weight of the epoxy resin described in Example 1, solution being effected by stirring the mixture for 10 minutes at 250° F. Thereupon, 10 parts by weight of cork powder were mixed in thoroughly, and the temperature was raised to 350° F. Curing, accompanied by foaming expansion, began immediately. The volume of the expanded, thermoset product was less than that obtained by procedures described above.

Example 9

This example describes production of an expanded product using bark as the cork material.

The barks of a fir tree, a maple tree, and an elm tree were individually powdered and used as a replacement for the cork powder in the procedure described in Example 1. Each gave a foamed material comparable to the product of Example 1.

The powdered wood of these trees is not effective to produce such foaming expansion.

Example 10

This example describes conducting the process of Example 1 with another alternative cork material.

Two mixtures were prepared as in Example 1. Mixture A contained 75 parts by weight of the epoxy resin employed in Example 1, and 5 parts of balsa wood dust (100% through No. 50 mesh) obtained by sanding a piece of balsa wood. Mixture B consisted of 37 parts by weight of the polyamide described in Example 1 and 10 parts by weight of triethylenetetramine. The two mixtures were mixed together, poured into a pre-lubricated mold, expanded, cured and cooled as in Example 1. An expanded cellular product was obtained which had a density and physical characteristics like those of the product of Example 1, with the exception of being lighter in color.

Example 11

This exmaple describes production of an expanded product from an aliphatic epoxy resin.

The epoxy resin employed in the process described below is an aliphatic material, reportedly derived by condensation of epichlorohydrin with a polyhydric alcohol like glycerol.

A mixture of 5 parts by weight of triethylenetetramine with 37 parts by weight of the polyamide described in Example 1 was added to a mixture of 5 parts by weight of cork powder as described in Example 1 with 75 parts by weight of the aliphatic epoxy resin (Epon 562, sold by Shell Chemical Corp., New York, N.Y.). After thorough intermixture of all of the ingredients, the resulting mixture was poured into a lubricated mold, and the mold was cooled while expansion of the mass took place. An expanded, thermoset resinous product was obtained.

From the foregoing description it will be evident that numerous variations and modifications can be made in the present process without departure from the invention.

What is claimed is:

1. The method for the preparation of an expanded cellular resinous product which comprises thermosetting an epoxy resin, said epoxy resin containing a

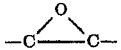

group, by reaction with an epoxy resin curing agent in contact with from about 0.5% to about 20% by weight of the epoxy resin, of a material selected from the group consisting of cork and balsa wood, while permitting expansion of the resinous mass.

2. The method for the preparation of an expanded cellular resinous product which comprises thermosetting an epoxy resin, said epoxy resin containing a

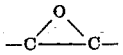

group, by reaction of an epoxy resin curing agent in the presence of from about 0.5% to about 20%, by weight of the epoxy resin, of a comminuted material selected from the group consisting of cork and balsa wood dispersed in the resinous mass, while permitting expansion of the mass.

3. The method for preparing an epoxy resin foam which comprises intimately mixing an epoxy resin, said epoxy resin containing a

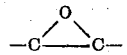

group, with from about 0.5% to about 20%, by weight of the epoxy resin, of a comminuted material selected from the group consisting of cork and balsa wood, and an epoxy resin curing agent, and thermosetting said epoxy resin by reaction with said epoxy resin curing agent in a space having a volume greater than the volume of said materials initially.

4. The method which comprises incorporating from about 0.5% to about 20%, by weight of the epoxy resin, of a comminuted material selected from the group consisting of cork and balsa wood into an epoxy resin, said epoxy resin containing a

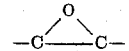

group, prior to conversion of said epoxy resin to the thermoset condition by reaction with an epoxy resin curing agent in a space having a volume greater than the volume of said materials initially.

5. The method for the preparation of an expanded cellular resinous product which comprises thermosetting an epoxy resin, said epoxy resin containing a

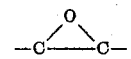

group, by reaction of an epoxy resin curing agent in the presence of from about 0.5% to about 20%, by weight of the epoxy resin, of a comminuted material selected from the group consisting of cork and balsa wood dispersed in the resinous mass, while permitting expansion of the mass, said epoxy resin being the condensation product of epichlorohydrin and a bisphenol corresponding to the formula

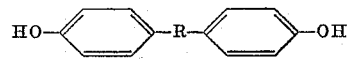

where R is a linking radical selected from —O— and

where Y is selected from H and $C_xH_{2x-1}$ and $x$ is an integer of from 1 to 16.

6. The method which comprises mixing an epoxy resin which is the product of condensation of a bisphenol and epichlorohydrin, said epoxy resin containing a

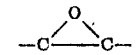

group, with an epoxy resin curing agent comprising an aliphatic polyamine in the presence of from about 0.5% to about 20%, by weight of the epoxy resin, of a comminuted material selected from the group consisting of cork and balsa wood dispersed in the resinous mass, and allowing said resin to react with said polyamine in a space permitting expansion of the resinous mass.

7. The method of claim 6 wherein said comminuted material is cork, and said cork is supplied by dispersing comminuted bark, said bark comprising cork, in said resinous mass.

8. The method of claim 6 wherein said comminuted material is finely divided cork powder.

9. The method of claim 5, wherein said curing agent comprises a polyamide which is the product of condensation of a polyamine with a polymerized long chain fatty acid compound.

10. The method for the preparation of an expanded cellular resinous product which comprises thermosetting a mixture of a monomeric epoxy compound, said monomeric epoxy compound containing a

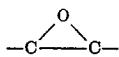

group, and a polymeric epoxy resin which is the product of condensation of epichlorohydrin and a bisphenol, said epoxy resin containing a

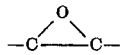

group, by reaction with an epoxy resin curing agent comprising an aliphatic polyamine, in the presence of from about 0.5% to about 20%, by weight of the epoxy resin, of a comminuted material selected from the group consisting of cork and balsa wood dispersed in said mixture, while permitting expansion of the resinous mass.

11. The method which comprises intimately mixing (a) from about 0.5% to about 20%, by weight of the epoxy resin, of finely divided cork powder with (b) an epoxy resin which is the product of condensation of epichlorohydrin and 2,2-bis(4-hydroxyphenyl)propane, said epoxy resin containing a

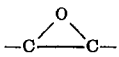

group, and (c) an aliphatic polyamine, and allowing said mixture to expand and thermoset in the plastic state to produce a low density expanded cellular resinous product.

12. An epoxy resin composition capable of being expanded upon being thermoset, which comprises a mixture of an epoxy resin, said epoxy resin containing a

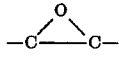

group, and from about 0.5% to about 20%, by weight of the epoxy resin, of a comminuted material selected from the group consisting of cork and balsa wood.

13. The composition of claim 12, further provided that said epoxy resin is a liquid epoxy resin having an epoxide equivalent of below about 250.

14. An epoxy resin composition capable of being expanded upon being thermoset, which comprises a mixture of from about 0.5% to about 20%, by weight of the epoxy resin, of finely divided cork powder and an epoxy resin which is the product of condensation of epichlorohydrin and 2,2-bis(4-hydroxyphenyl)propane, said epoxy resin containing a

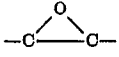

group.

15. An epoxy resin composition capable of being expanded upon being thermoset, which comprises a mixture of a monomeric epoxy compound, said monomeric epoxy compound containing a

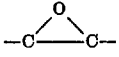

group, a polymeric epoxy resin, said epoxy resin containing a

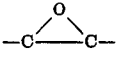

group, and from about 0.5% to about 20%, by weight of the epoxy resin, of a comminuted material selected from the group consisting of cork and balsa wood.

16. An expanded resin structure comprising a mass of the thermoset product of the reaction of an epoxy resin, said epoxy resin containing a

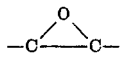

group, with an epoxy resin curing agent, said mass containing from about 0.5% to about 20%, by weight of said epoxy resin, of a material selected from the group consisting of cork and balsa wood.

17. An expanded resin structure comprising a mass of the thermoset product of the reaction of an epoxy resin, said epoxy resin containing a

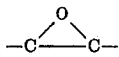

group, with an epoxy resin curing agent, said mass containing from about 0.5% to about 20%, by weight of said epoxy resin, of comminuted cork.

18. An expanded resin structure consisting of the thermoset product of the reaction of an epoxy resin curing agent with an epoxy resin which is the product of condensation of epichlorohydrin and a bisphenol corresponding to the formula

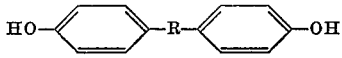

where R is a linking radical selected from —O— and

where Y is selected from H and $C_xH_{2x-1}$ and $x$ is an integer of from 1 to 16, said epoxy resin containing a

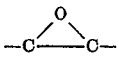

group, said structure containing from about 0.5% to about 20%, by weight of said epoxy resin, of a comminuted material selected from the group consisting of cork and balsa wood in the resinous material.

19. The expanded resin structure of claim 18 wherein said curing agent comprises a polyamide which is the product of condensation of a polyamine with a polymerized long chain fatty acid compound, and said comminuted material is cork.

20. An expanded resin structure comprising a mass of the thermoset product of the reaction of (a) an epoxy resin which is the product of condensation of epichlorohydrin and 2,2-bis(4-hydroxyphenyl)propane, said epoxy resin containing a

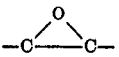

group, with (b) an epoxy resin curing agent comprising an aliphatic polyamine, said mass containing from about 0.5% to about 20%, by weight of said epoxy resin, of comminuted cork.

References Cited in the file of this patent

UNITED STATES PATENTS

| | | |
|---|---|---|
| 2,387,730 | Alderson | Oct. 30, 1945 |
| 2,506,486 | Bender et al. | May 2, 1950 |
| 2,739,134 | Parry et al. | Mar. 20, 1956 |
| 2,831,820 | Aase | Apr. 22, 1958 |
| 2,904,524 | Baumgartner | Sept. 15, 1959 |

FOREIGN PATENTS

| | | |
|---|---|---|
| 546,382 | Great Britain | July 10, 1942 |
| 783,956 | Great Britain | Oct. 2, 1957 |

UNITED STATES PATENT OFFICE
CERTIFICATION OF CORRECTION

Patent No. 2,993,014   July 18, 1961

Gerald W. Schardt

It is hereby certified that error appears in the above numbered patent requiring correction and that the said Letters Patent should read as corrected below.

Column 1, line 36, for "maximum" read -- minimum --; column 2, line 62, for "present" read -- presence --; column 7, line 35, the formula should appear as shown below instead of as in the patent:

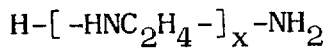

column 9, line 28, for "characteristic" read -- characteristics --; columns 11 and 12, line 55, the formula should appear as shown below instead of as in the patent:

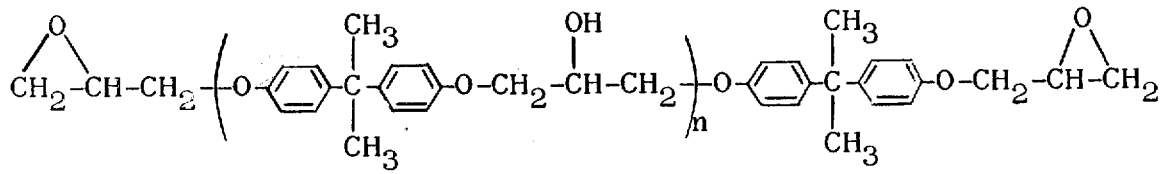

column 12, line 29, for "struuctures" read -- structures --; column 12, line 37, for "expanding" read -- expanded --; column 15, line 70 and column 16, line 32, for "by reaction of", each occurrence, read -- by reaction with --.

Signed and sealed this 16th day of January 1962.

(SEAL)
Attest:

ERNEST W. SWIDER
Attesting Officer

DAVID L. LADD
Commissioner of Patents